US005241894A

United States Patent [19]

Hundertmark

[11] Patent Number: 5,241,894

[45] Date of Patent: Sep. 7, 1993

[54] MARINE POWER STEERING SYSTEM

[75] Inventor: James M. Hundertmark, Fond du Lac, Wis.

[73] Assignee: Brunswick Corporation, Skokie, Ill.

[21] Appl. No.: 807,057

[22] Filed: Dec. 12, 1991

Related U.S. Application Data

[60] Division of Ser. No. 368,776, Jun. 20, 1989, Pat. No. 5,074,193, which is a continuation-in-part of Ser. No. 274,745, Nov. 15, 1988, abandoned, which is a continuation of Ser. No. 79,097, Jul. 29, 1987, abandoned.

[51] Int. Cl.[5] ........................ F15B 15/17; F16D 31/02

[52] U.S. Cl. ........................................ 91/417 R; 91/422; 60/418; 440/60

[58] Field of Search ...................... 91/417 R, 235, 321, 91/422, 222, 368; 60/418; 440/60, 61

[56] References Cited

U.S. PATENT DOCUMENTS

| | | | |
|---|---|---|---|
| 2,705,940 | 4/1955 | Edwards | 91/422 |
| 2,735,502 | 2/1956 | Muller | 91/422 X |
| 2,861,144 | 11/1958 | Favre | 60/418 X |
| 2,969,044 | 1/1961 | Leduc | 91/422 X |
| 3,015,310 | 1/1962 | Faisandier | 91/422 X |
| 3,099,940 | 8/1963 | Leduc | 91/49 |
| 3,120,788 | 2/1964 | Leduc | 91/422 X |
| 3,171,254 | 3/1965 | Leduc | 60/418 X |
| 3,534,500 | 10/1970 | Boehm et al. | 60/418 X |
| 3,554,086 | 1/1971 | Wills | 91/417 R X |
| 3,574,999 | 4/1971 | Nectoux | 60/418 |
| 3,722,367 | 3/1973 | Clark et al. | 91/417 R X |
| 3,799,300 | 3/1974 | Cochrane et al. | 91/360 X |
| 3,856,048 | 12/1974 | Gratzmuller | 139/31 |
| 4,050,359 | 9/1977 | Mayer | 91/422 X |
| 4,108,273 | 8/1978 | Sarti et al. | 91/422 X |
| 4,295,833 | 10/1981 | Borst | 91/360 X |
| 4,361,076 | 11/1982 | Gluck | 92/422 |
| 4,568,292 | 2/1986 | Hall | 440/61 |
| 4,611,634 | 9/1986 | Kruckewitt et al. | 138/31 |
| 4,644,976 | 2/1987 | Peter et al. | 138/31 |
| 4,710,141 | 12/1987 | Ferguson | 440/61 |
| 4,744,777 | 5/1988 | Ferguson | 440/61 |
| 4,892,494 | 1/1990 | Ferguson | 440/61 |
| 4,957,457 | 9/1990 | Probst et al. | 440/61 |

FOREIGN PATENT DOCUMENTS

| | | | |
|---|---|---|---|
| 656348 | 1/1963 | Canada | 91/417 R |
| 1225052 | 9/1966 | Fed. Rep. of Germany | 91/422 |
| 1133061 | 3/1957 | France | 91/49 |
| 1236419 | 6/1960 | France . | |
| 0100094 | 6/1984 | Japan | 440/61 |
| 0125996 | 6/1987 | Japan | 440/61 |
| 891792 | 3/1962 | United Kingdom | 91/422 |
| 1151773 | 5/1969 | United Kingdom | 60/418 |

*Primary Examiner*—Edward K. Look
*Assistant Examiner*—Hoang Nguyen
*Attorney, Agent, or Firm*—Andrus, Sceales, Starke & Sawall

[57] ABSTRACT

A marine hydraulic system for operation of a power steering assembly includes a pressure accumulator to provide pressurized hydraulic fluid and valving that permits the transfer of hydraulic fluid within the cylinder to provide efficient use of hydraulic fluid.

2 Claims, 9 Drawing Sheets

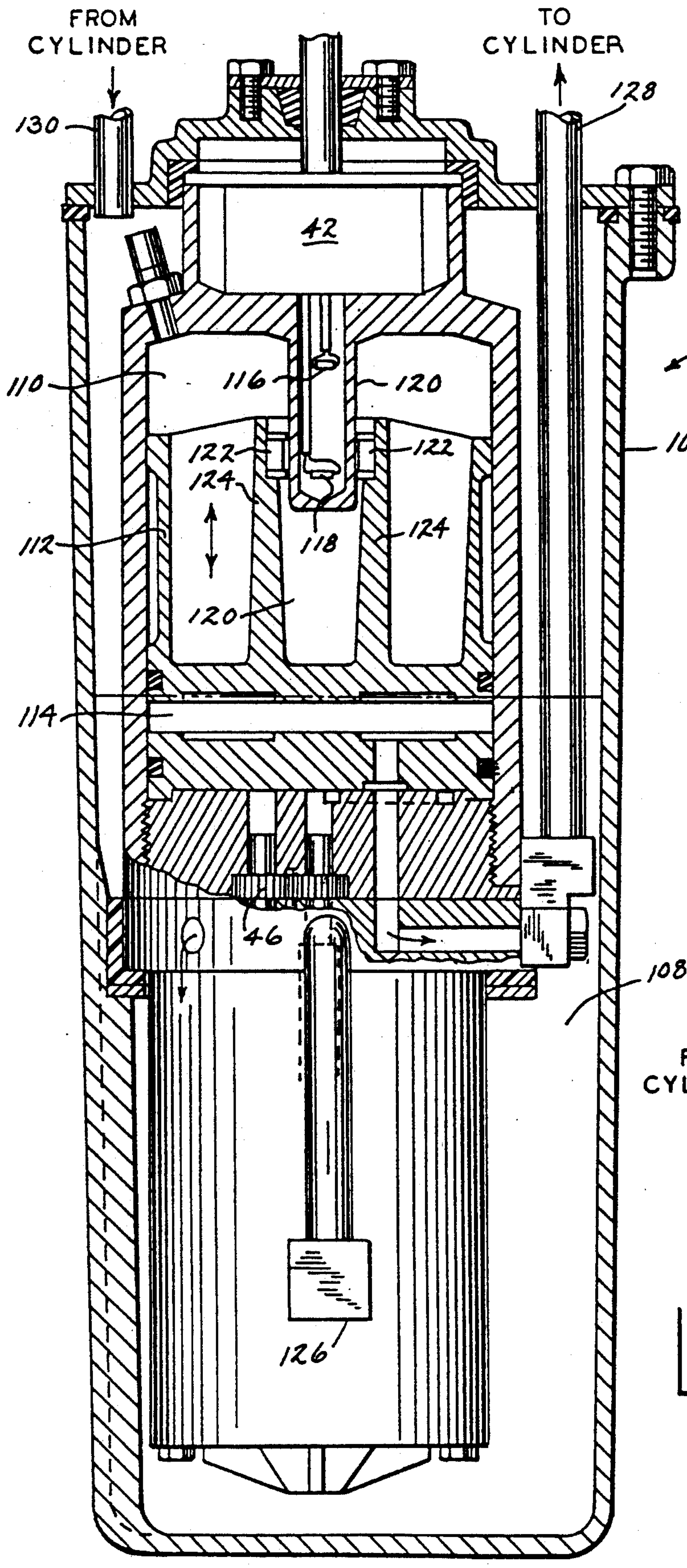
FIG. 6
FIG. 7
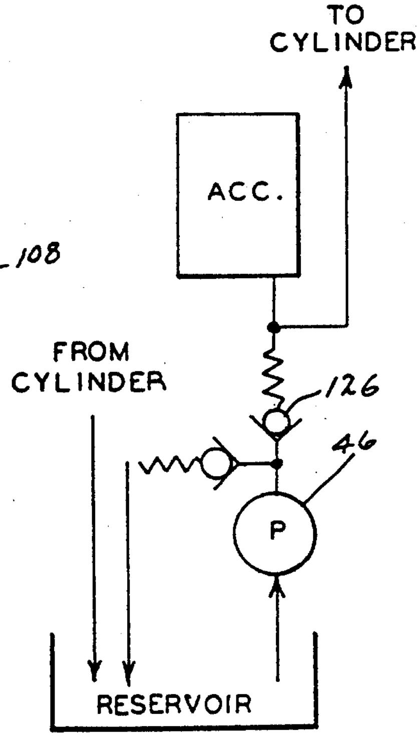

MARINE POWER STEERING SYSTEM

This application is a division of U.S. application Ser. No. 07/368,776 filed Jun. 20, 1989, now U.S. Pat. No. 5,074,193, which is a continuation-in-part of U.S. application Ser. No. 07/274,745 filed Nov. 15, 1988, now abandoned, which is a continuation of U.S. application Ser. No. 07/079,097 filed Jul. 29, 1987, now abandoned.

BACKGROUND OF THE INVENTION

The present invention relates to a marine power steering system and more particularly to a system that utilizes an accumulator or pressurized cylinder to supply hydraulic fluid to the power steering system.

Typically, marine power steering systems for outboard motors and stern drives utilize an extendible and contractible steering link connected to the boat transom and to the propulsion unit and the extension and contraction of the piston rod in the steering link causes the propulsion unit to pivot and steer the boat.

Such units require a rather large hydraulic pump since rather large volumes of hydraulic fluid are required if the steering is moved rapidly from one side to the other. Such systems also require that the engine be running in order for the steering system to operate since the hydraulic pump is powered by the engine.

SUMMARY OF THE INVENTION

A marine hydraulic system for operation of a power steering assembly includes a pump to provide pressurized hydraulic fluid from a reservoir and a control system to selectively place the pump in an operative or inoperative mode.

The hydraulic system is also provided with a valve that selectively provides pressurized hydraulic fluid to a hydraulic cylinder to cause extension or retraction of the piston rod in the cylinder.

In accordance with one aspect of the invention, the hydraulic system is provided with a pressure accumulator that maintains a reserve of hydraulic fluid under pressure for eventual delivery to the valve.

In accordance with another aspect of the invention, the valve is provided with ball-type check valves to control the hydraulic flow rather than using a spool-type valve which by its very nature allows for some leakage.

In accordance with yet another aspect of the invention, hydraulic fluid from one side of the cylinder is transferred to be utilized on the other side of the cylinder during cylinder movement so that the accumulator need only provide the differential hydraulic fluid.

The present invention thus provides a marine hydraulic system that can operate even when the engine is not operating and which eliminates the need for a large and continuously operating hydraulic pump.

BRIEF DESCRIPTION OF THE DRAWINGS

The drawings illustrate the best mode presently contemplated of carrying out the invention.

In the drawings:

FIG. 6 is a side cross sectional view of the accumulator used in the hydraulic system;

FIG. 7 is a schematic of the hydraulic system connecting the hydraulic pump, the accumulator and the flow line to the valve and cylinder;

DESCRIPTION OF THE PREFERRED EMBODIMENT

Figure 1:
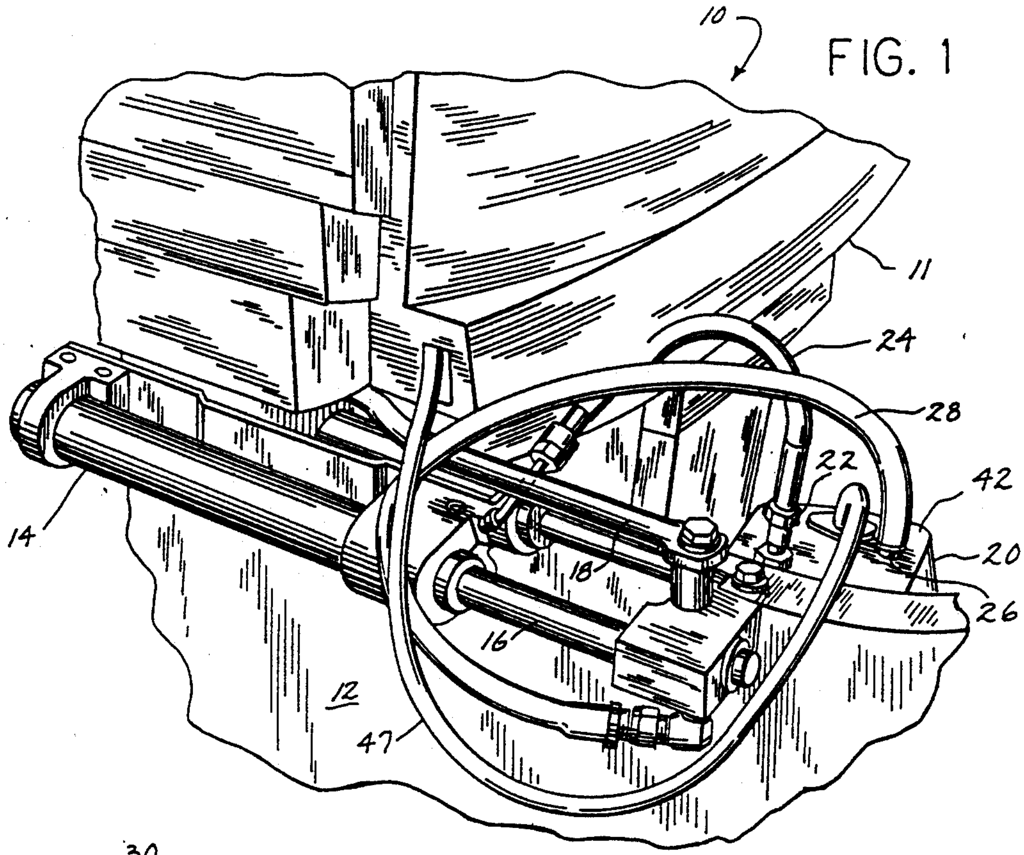
FIG. 1 is a perspective view of a marine power steering assembly constructed according to the present invention and mounted on the transom of a boat and operatively connected to an outboard motor.

FIG. 1 shows an outboard motor 10 pivotally mounted to the transom 12 of a boat in a conventional manner.

The outboard motor includes a transom bracket, not illustrated, fixed to the transom 12 of the boat with the propulsion unit 11 pivotally attached to a swivel bracket, not illustrated, to provide a steering axis. The swivel bracket is in turn pivotally attached to the transom bracket to provide a tilt axis.

A hydraulic cylinder 14 having an extendible and contractible piston rod 16 is fixedly mounted on the swivel bracket to tilt with the drive unit 11 and through linkage 18 the linear movement of the piston rod 16 is translated into pivotal movement of drive unit 11.

Also mounted on transom 12 is accumulator 20 having a port 22 which supplies pressurized hydraulic fluid to cylinder 14 via hose 24 and a port 26 which receives exhausted hydraulic fluid from cylinder 14 via hose 28.

Figure 2:
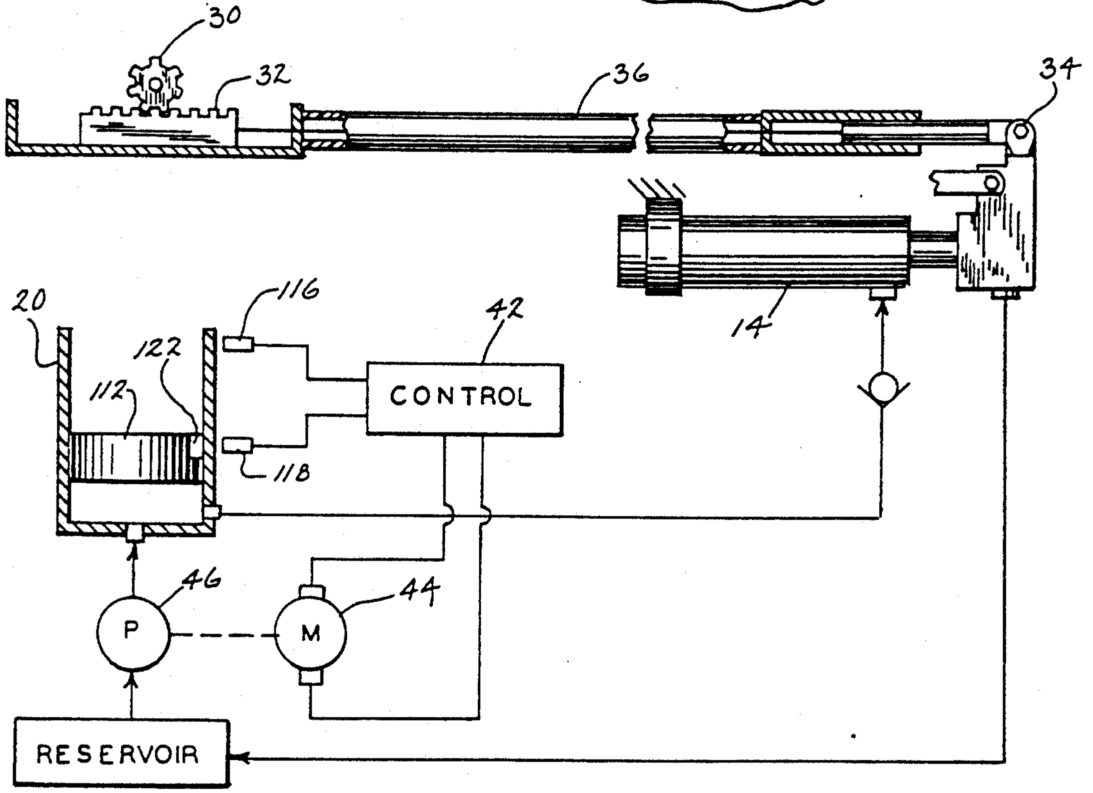
FIG. 2 is a schematic drawing of the hydraulic system and steering assembly of FIG. 1.

The valving for hydraulic cylinder 14 is contained within the cylinder body and the operation of the valving is controlled and determined by the movement of the steering mechanism consisting of gear 30 operatively connected to the steering wheel and movable rack 32. The movement of rack 32 is communicated to yoke 34 by means of linkage 36. This results in pivotal movement of control stem 38 which in turn causes linear movement of control rod 40. The remainder of the hydraulic system in FIG. 2 shows accumulator 20 and its associated control package 42 which operates electrical motor 44 and its associated hydraulic pump 46. Electrical power is provided to control package 42 via cable 47.

Figure 3:
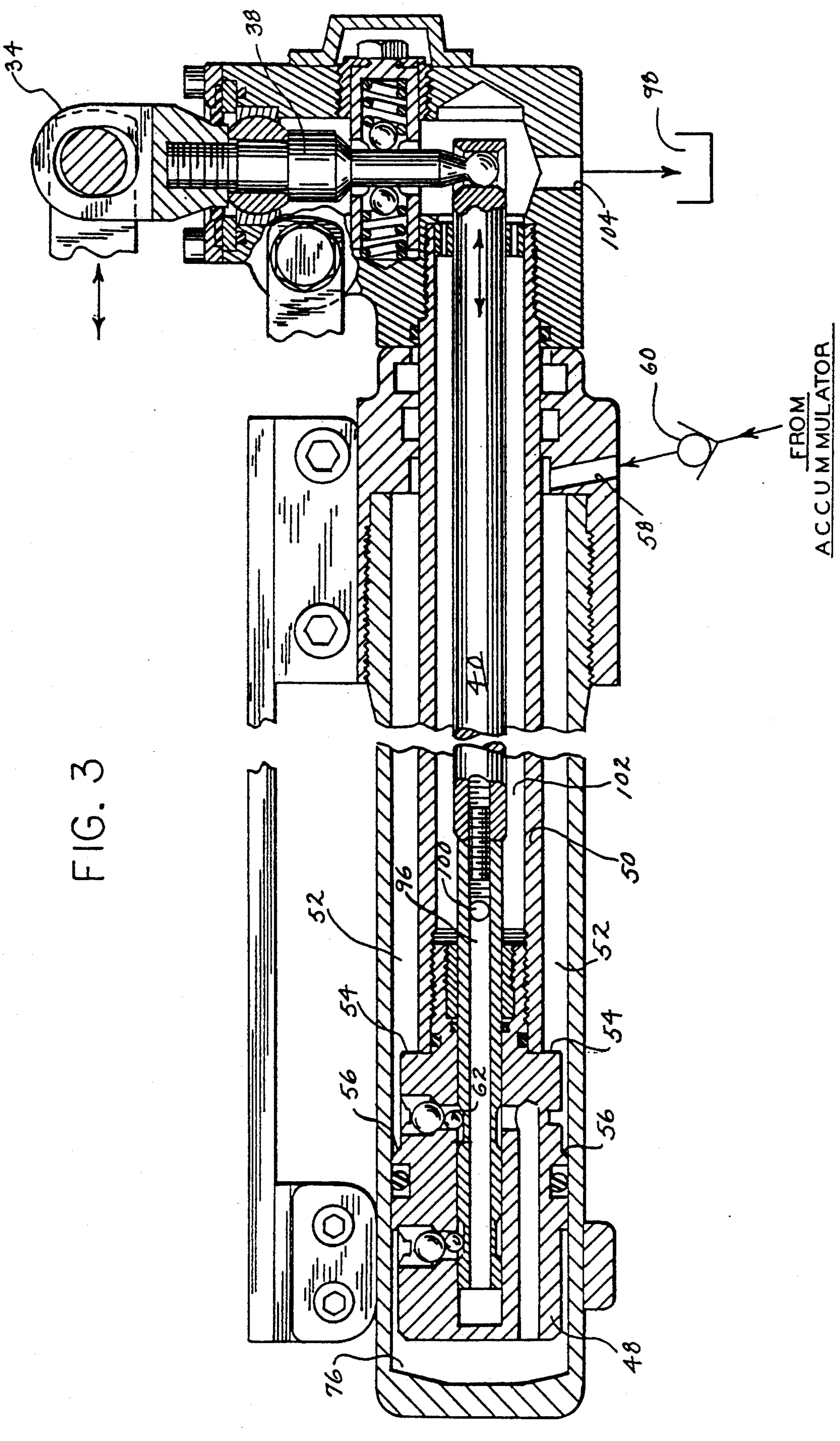
FIG. 3 is a side cross sectional view of the valve and cylinder assembly in a neutral position.
Figure 4:
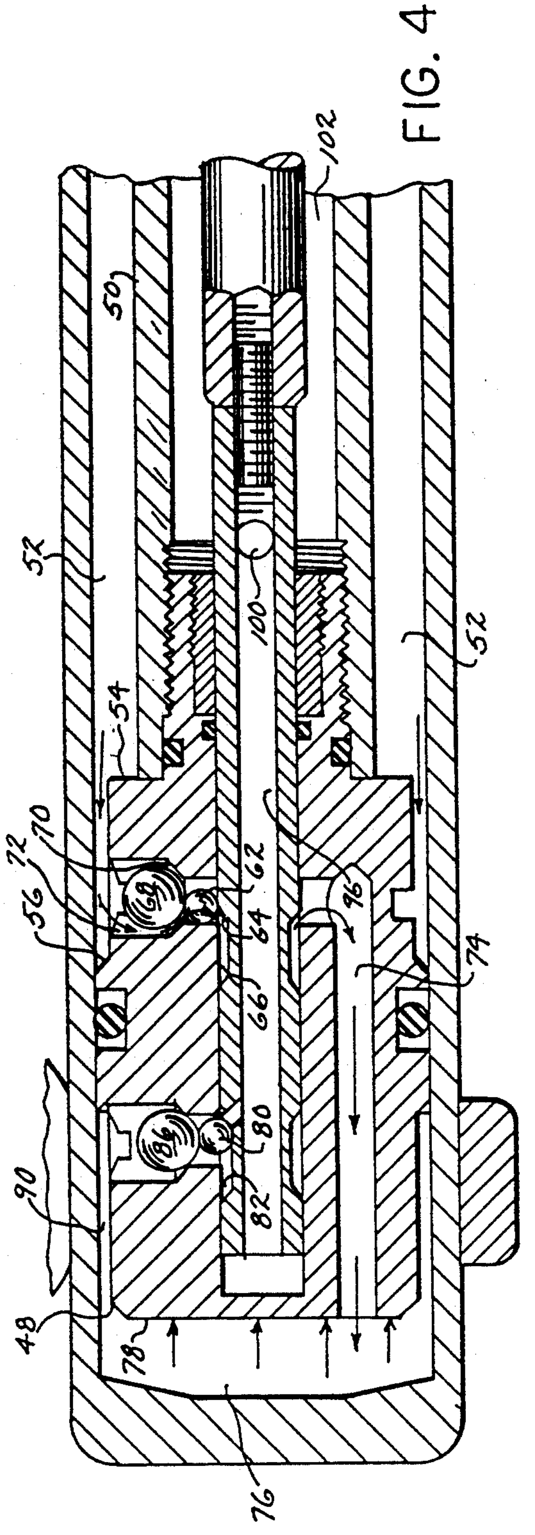
FIG. 4 is a side cross sectional view of the valve and cylinder with the valve in a position to allow extension of the piston rod.
Figure 5:
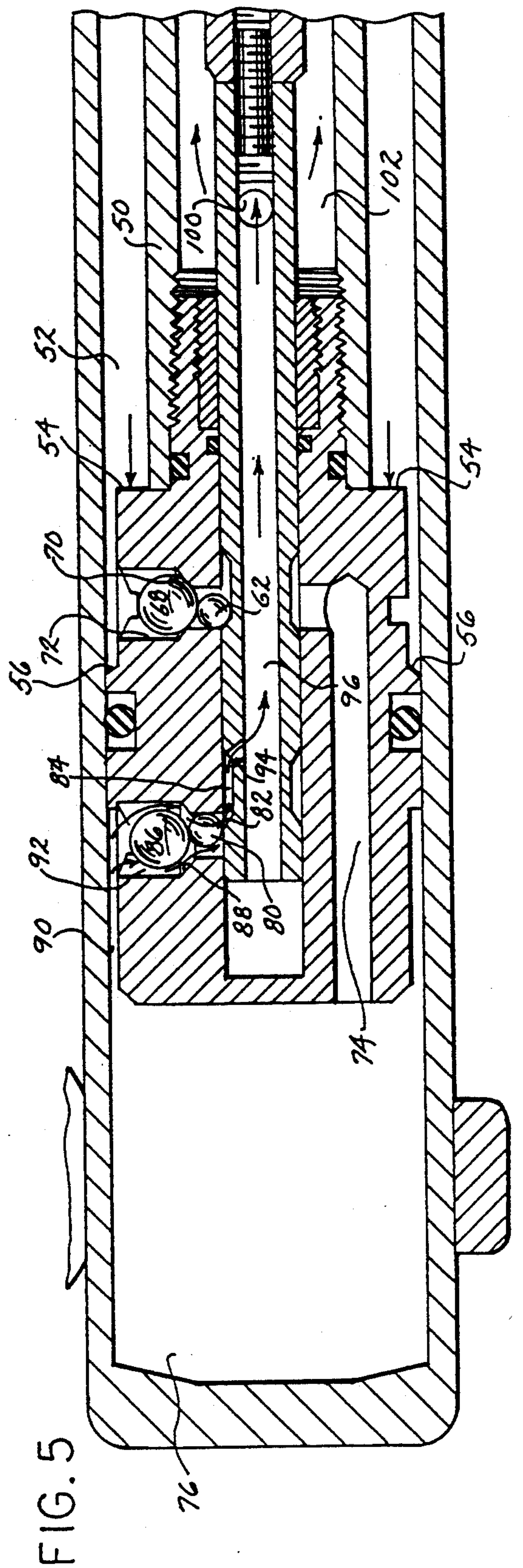
FIG. 5 is a side cross sectional view of the valve and cylinder with the valve in a position to allow retraction of the piston rod.

As mentioned above, the valving for hydraulic cylinder 14 is contained within the cylinder body and is best shown in FIG. 3 through FIG. 5.

In FIG. 3, piston head 48 is in its far left position and thus, piston rod 50 in its fully contracted position. In this position there is no flow of hydraulic fluid and the only hydraulic forces experienced by piston head 48 are those caused by hydraulic fluid in chamber 52 acting on surfaces 54 and 56 and tending to cause right to left movement of piston head 48.

The pressurized hydraulic fluid in chamber 52 is delivered via port 58 which receives the hydraulic fluid via check valve 60 from accumulator 20 through hose 24.

In order to cause left to right movement (FIG. 4) of piston head 48, control rod 40 must be moved right to left from its position shown in FIG. 3 to that shown in FIG. 4. As control rod 40 moves to the left, poppet actuator 62 will ride up incline 64 of recess 66 and will engage the bottom surface of poppet 68 and lift it from its seat 70. With poppet 68 off of seat 70 pressurized hydraulic fluid is allowed to flow from chamber 52 into poppet chamber 72 around poppet 68 and actuator 62 and into recess 66. From there, the hydraulic fluid flows through passageway 74 and eventually to chamber 76 on the head side of the piston assembly. Here, the pressurized hydraulic fluid acts on surface 78 of piston head 48 and since this surface is greater than that of combined surfaces 54 and 56, piston head 48 will be moved in a left to right direction causing extension of piston rod 50. Thus, when moving piston head 48 from left to right, the hydraulic fluid in chamber 52 is utilized in chamber 76 rather than being dumped to reservoir. This results in a more efficient use of hydraulic fluid and in less use of fluid from accumulator 20.

In order to contract piston rod 50 and thus cause the oppsoite pivotal movement of marine unit 10, it is necessary to move control rod 40 from its position shown in FIG. 4 left to right to its positon shown in FIG. 5. In its FIG. 5 position, poppet actuator 62 returns to its lowest position in recess 66 thus allowing poppet 68 to become reseated while poppet actuator 80 rides up incline 82 of recess 84 and engages the bottom surface of poppet 86 causing it to lift off of its seat 88. With poppet 86 lifted off seat 88, hydraulic fluid is allowed to flow from chamber 76 along channel 90, through poppet chamber 92, around poppet 86 and actuator 80 and into recess 84. From recess 84, the hydraulic fluid flows through connecting passage 94 leading into passageway 96 which dumps the hydraulic fluid into reservoir 98 by means of hole 100 leading to passageway 102 which is in communication with outlet port 104. Thus, in this position, all hydraulic forces on surface 78 are relieved and since poppet 68 is now in its seated position, the constant hydraulic forces from accumulator 20 acting on surface 54 and 56 are now unopposed and piston head 48 is moved from right to left.

As shown in FIG. 6, accumulator 20 includes an outer casing 106 that forms a hydraulic fluid reservoir 108 in the lower portion of the casing 106.

Accumulator 20 is gas charged so that pressurized gas in chamber 110 urges piston 112 into contact with hydraulic fluid in chamber 114.

The position of piston 112 is monitored by means of magnetically sensitive switches 116 and 118 that are disposed within arm 120 that extends downwardly into chamber 110 and into centrally located cavity 120 in piston 112. Magnets 122 are disposed within walls 124 of cavity 120. Thus, the vertical position of piston 112 is monitored by the interaction of magnets 122 with magnetically sensitive switches 116 and 118.

In FIG. 2, piston 112 is near its extreme lower position with only reserve oil below. This position will be detected by magnetic switch 118. Upon detection of this condition, an electrical signal is generated by electrical control package 42 and electric motor 44 and associated hydraulic pump 46 are placed into operation. Hydraulic pump 46 will then pump hydraulic fluid from reservoir 108 through filter 126 and upwardly into chamber 114. Reverse flow of hydraulic fluid from chamber 114 back to pump 46 is prevented by check valve 127. Hydraulic pump 46 will continue to pump hydraulic fluid into chamber 114 until cylinder 112 reaches an upper position in which magnets 122 will activate switch 116 resulting in deactivation of electrical motor 44 and pump 46.

Accumulator 20 is utilized to provide pressurized hydraulic fluid to hydraulic cylinder 14 via work port 128. Hydraulic fluid exhaust from hydraulic cylinder 14 is returned to reservoir 108 in casting 106 by means of work port 130.

A sufficient amount of hydraulic fluid is maintained under pressure in chamber 114 of accumulator 20 so that it is possible to apply pressurized hydraulic fluid to hydraulic cylinder 14 without operating hydraulic pump 46. Since it is possible to cause left to right movement of piston head 48 by means of transferring pressurized hydraulic fluid from the rod side to the head side of piston 48, such movement can be accomplished without external power.

Figure 8:
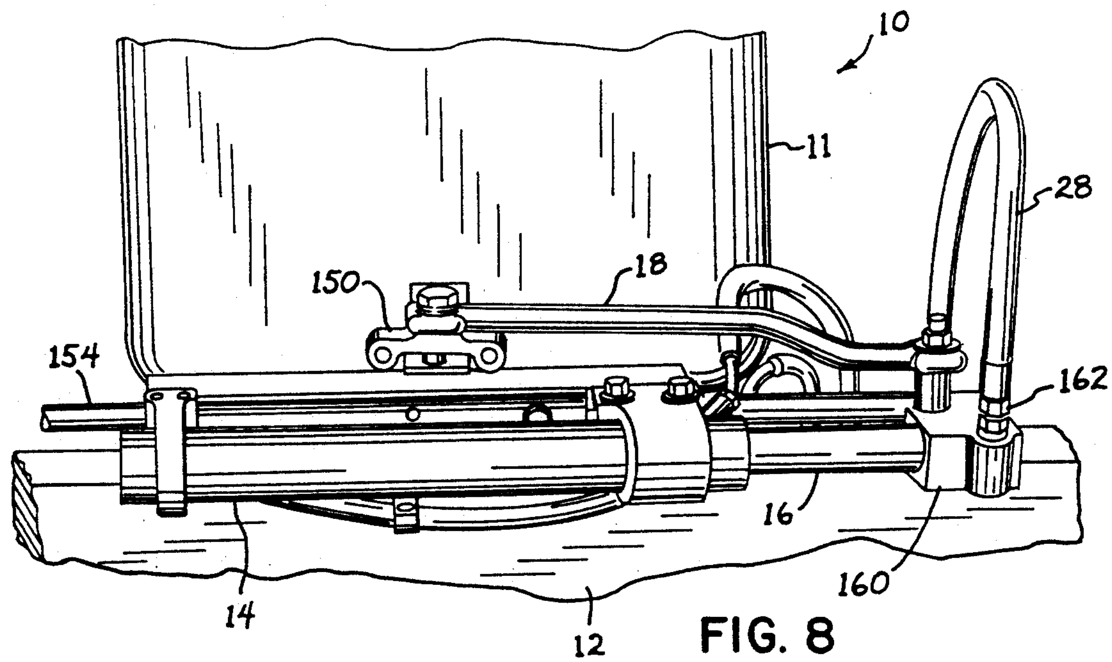
FIG. 8 is a partial front elevation view of the marine power steering assembly of the invention mounted to the boat transom and connected to the outboard motor.
Figure 9:
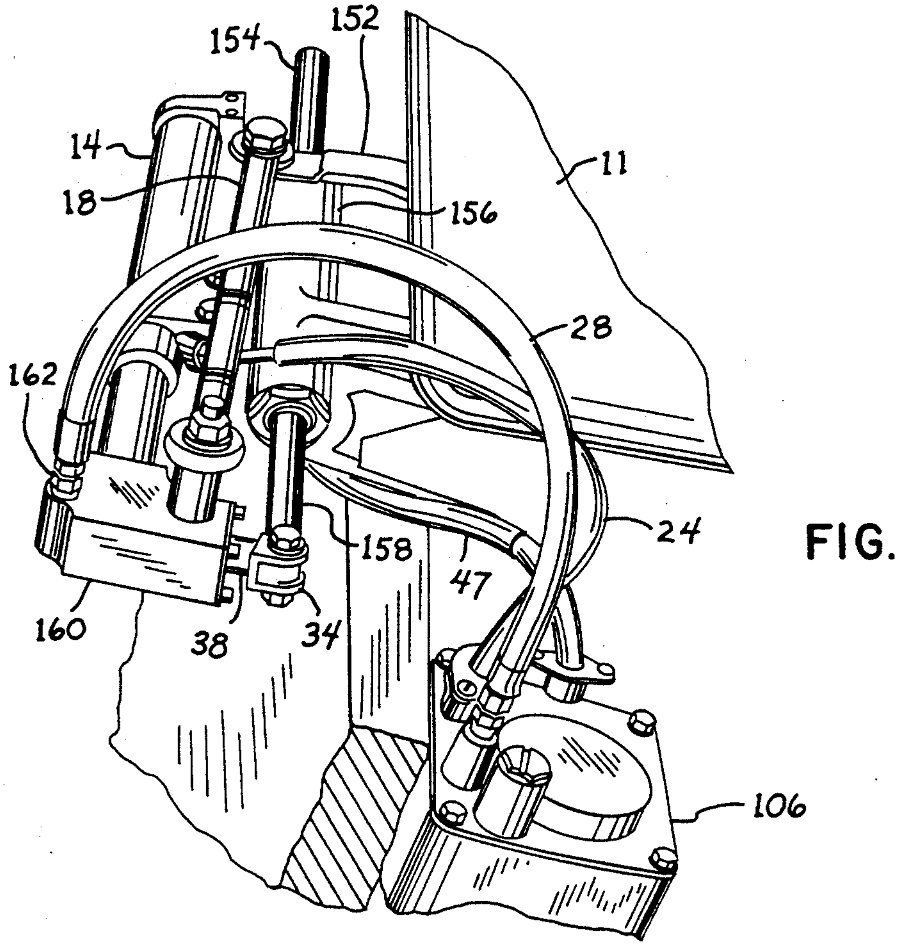
FIG. 9 is a perspective view somewhat similar to FIG. 1, showing the marine power steering system of the invention as mounted.
Figure 10:
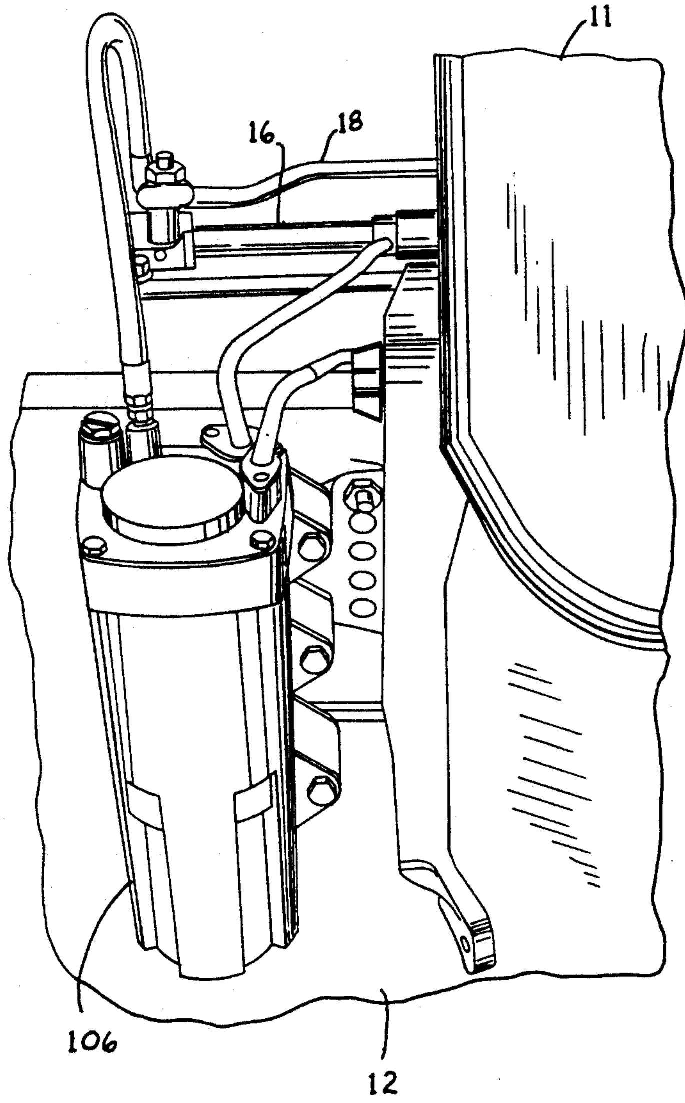
FIG. 10 is a rear elevation view showing the mounting of the accumulator to the outer face of the boat transom.

FIGS. 8–10 more clearly illustrate the mounting and relationship of the power steering assembly of the invention relative to boat transom 12 and drive unit 11. As shown in FIGS. 8 and 9, the leftward end of linkage 18 is connected to a bracket 150 mounted to the fore end of a steering arm 152, which extends forwardly from drive unit 11 to effect pivoting movement thereof about a steering axis.

A steering cable 154 is slidably mounted within a guide tube 156. An output ram 158 extends from the opposite end of guide tube 156, and may be an integral extension of cable 154 or may operate as a result of internal hydraulic forces. Output ram 158 is connected at its outer end to yoke 34. Output ram 158 is responsive to cable 154 so as to cause pivoting movement of control stem 38, to which yoke 34 is connected.

The outer end of piston rod 16 is mounted to a block 160, to which the rightward end of linkage 18 is fixed.

As shown in FIGS. 9 and 10, casing 106 is mounted to the outboard side of transom 12 adjacent drive unit 11. When mounted as shown, casing 106 is disposed partly in the water during boat operation to facilitate cooling of hydraulic fluid contained within casing 106. Additionally, this location of casing 106 allows quick and easy mounting of casing 106 to boat transom 12. The location and installation of casing 106 as shown and described is in contrast to prior art power steering systems, which typically utilize a hydraulic pump driven directly by the engine.

Figure 11:
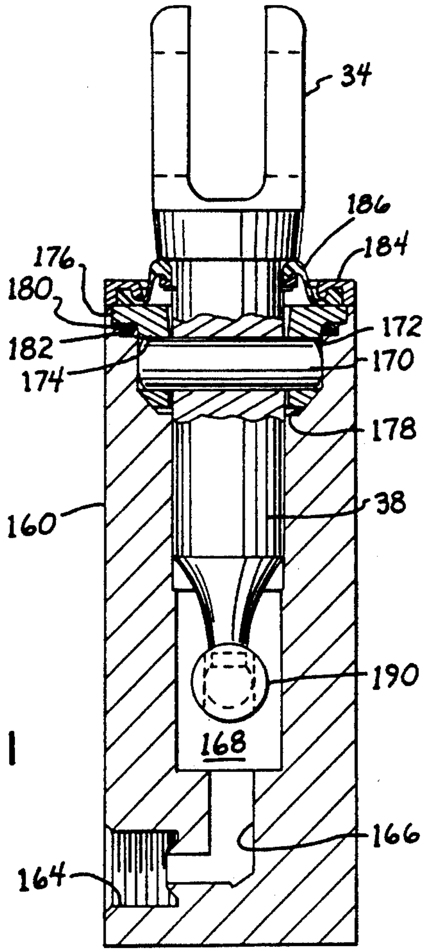
FIG. 11 is a partial sectional view showing the yoke and actuator assembly of the marine power steering system of the invention.

A fitting 162 is adapted to be received within a threaded recess 164 (FIG. 11) provided in block 160 for connecting exhaust hose 28 thereto. Recess 164 communicates through a passage 166 with a cavity 168, within which control stem 38 is mounted.

Control stem 38 is pivotable within cavity 168 about a pivot axis defined by a pin 170 which extends through control stem 38 such that its ends are positioned within a pair of openings 172, 174 provided within a collar 176. Collar 176 is received within a mating recess 178 provided in the end of block 160 in communication with cavity 168. A seal 180 is provided between collar 176 and a shoulder 182 of recess 178. A flexible seal arrangement, including a ring 184 and a flexible rubber sleeve 186, is provided at the end of block 160 to seal around control stem 38. Flexible sleeve 186 accommodates pivoting movement of control stem 38, maintaining a fluid-tight seal to prevent leakage around control stem 38.

In operation, collar 176 experiences a certain amount of movement resulting from pivoting movement of control stem 38, and is not rigidly fit within the end of block 160. The pivoting movement of control stem 38 is governed by the diameter of bore 168 within which it is placed. That is, the lower end of control stem 38 abuts the wall of bore 168, which relieves stress on pin 170 when control stem 38 is fully pivoted in one direction or another.

The assembly of control stem 38 and yoke 34 within cavity 168 in block 160 is substantially simplified with the construction according to the invention.

Figure 12:
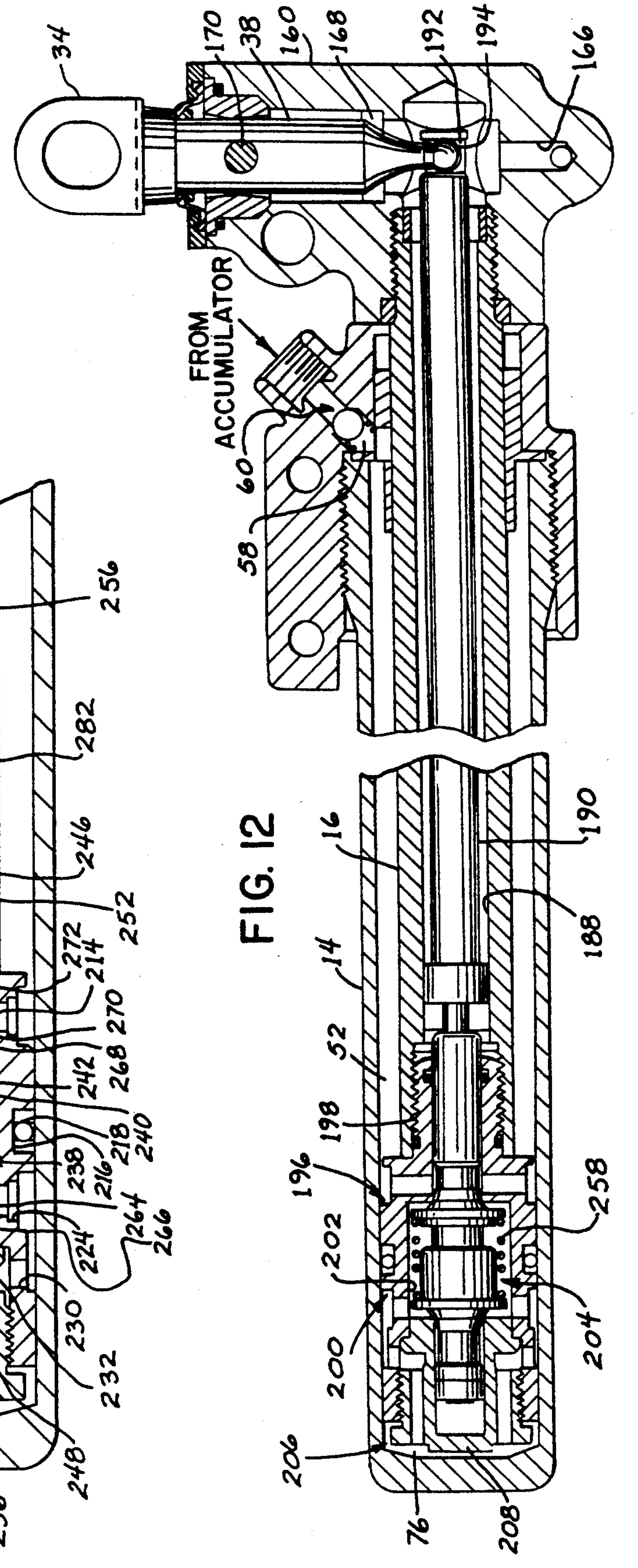
FIG. 12 is a partial cross sectional view of another embodiment of the valve and cylinder assembly, shown in a neutral position.

Referring now to FIG. 12, it is seen that the externally threaded rightward end of piston rod 16 is received within an internally threaded opening provided in the leftward side of block 160, for fixing block 160 to piston rod 16. Piston rod 16 is a tubular member including a central axial passage 188. With piston rod 16 mounted to block 160, axial passage 188 of piston rod 16 is in communication with cavity 168 within which control stem 38 is mounted. An actuator rod 190 is adapted for placement within passage 188 in piston rod 16. As shown, actuator rod 190 is provided at its rightward end with a pocket 192, within which a ball 194 provided at the end of control stem 38 is received.

A piston assembly, shown generally at 196, is adapted to be received within the internal cavity of hydraulic cylinder 14. Piston assembly 196 includes an externally threaded nipple 198 adapted to mate with internal threads provided at the leftward end of piston rod 16 for coupling piston assembly 196 thereto. Piston assembly 196 generally includes a body portion 200 having an internal cavity 202. A valve assembly, shown generally at 204, is adapted for placement within cavity 202. A piston cap shown at 206, including an end surface 208, is provided with an externally threaded portion adapted to mate with internal threads provided at the leftward end of piston assembly body portion 200.

Figure 13:
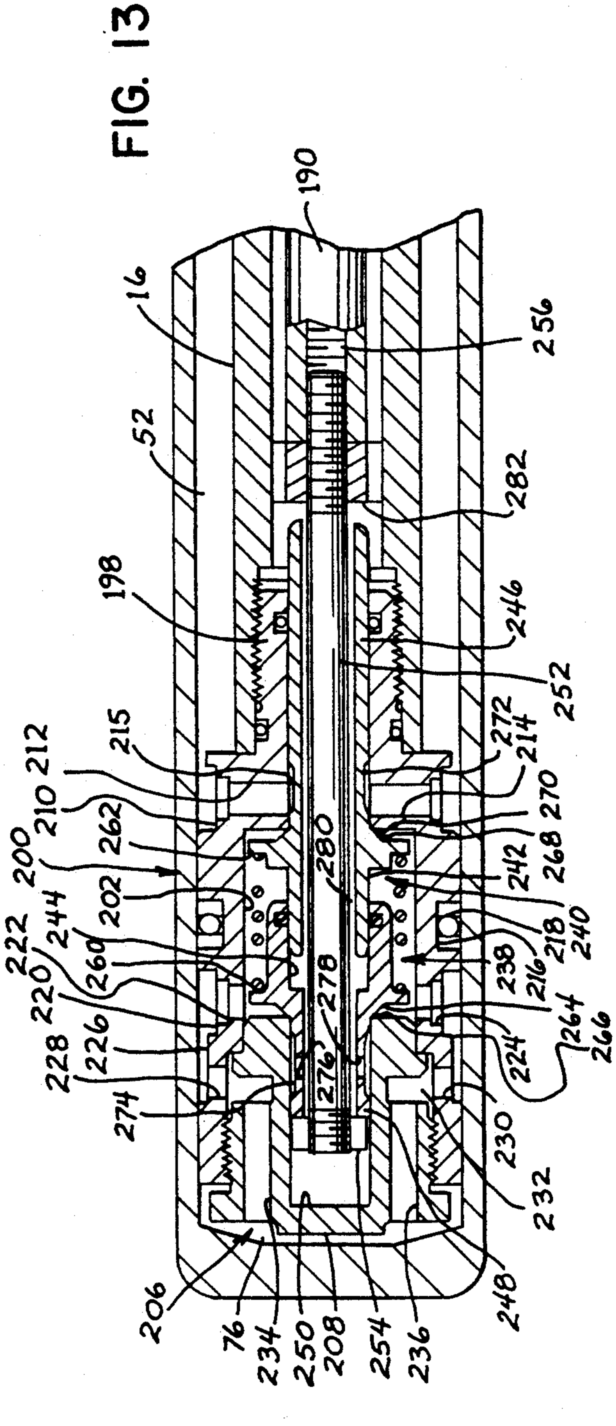
FIG. 13 is a blown up sectional view of the valve and cylinder assembly of FIG. 12, shown in a neutral position.

FIG. 13 illustrates the components just described in greater detail. As shown, body portion 200 includes a circumferential groove 210 at its rightward end. A series of passages, two of which are shown at 212, 214, provide communication between groove 210 and a central passage 215 formed in the rightward end of valve assembly body portion 200, which communicates with body portion cavity 202. A second groove 216 is formed in the outer surface of body portion 200, and is adapted to receive a seal assembly 218 which abuts the wall of chamber 52 for sealing chamber 52 from chamber 76. A third groove 220 is formed in body portion 200 and a series of passages, two of which are shown at 222, 224, extend between groove 220 and cavity 202. A fourth groove 226 is provided immediately adjacent and in communication with third groove 220. A series of passages, two of which are shown at 228, 230, extend between groove 226 and a cavity 232 formed in the leftward end of body portion 200.

The rightward end portion of cap 206 abuts a shoulder formed between cavity 232 and cavity 202 for sealing therebetween. With piston cap 206 connected to piston assembly body portion 200, a pair of passages 234, 236 extend from cavity 232 and open onto end surface 208 of cap 206.

Valve assembly 204 includes a retract valve 238 and an extend valve 240, both of which are adapted for mounting within body portion cavity 202. Extend valve 240 includes leftwardly projecting portion 242 adapted to be received within a bore 244 provided in retract valve 238. Extend valve 242 further includes a rightwardly projecting portion 246, which extends through and projects from the end of nipple 198 provided at the rightward end of body portion 200.

Retract valve 238 includes a leftwardly projecting portion 248, which is slidably received within a passage 250 formed in piston cap 206.

With this construction, retract valve 238 and extend valve 240 are slidably mounted within the interior of piston assembly 196.

Retract valve 238 and extend valve 240 are each formed with an axial internal passage therethrough which, when valves 238, 240 are assembled, receive a retract actuator rod 252. A nut 254 is threadedly mounted to the leftward end of retract actuator rod 252 within piston cap cavity 250. Retract actuator rod 252 is threadedly received at its rightward end within an internally threaded passage 256 provided in the leftward end of actuator rod 190.

A spring 258 bears between facing surfaces 260, 262 formed on retract and extend valves 238, 240, respectively. In this manner, a sealing surface 264 provided on retract valve 238 is normally urged into engagement with a seat 266 provided at the rightward end of piston cap 206. Similarly, a sealing surface 268 provided on extend valve 240 is normally urged into engagement with a seat 270 provided at the rightward end of body portion cavity 202. Cavity 202 is thereby normally sealed from exposure to fluid pressure within chamber 52.

An annular groove 272 is formed about the outer surface of rightwardly projecting portion 246 of extend valve 240 adjacent passages 212, 214. An annular groove 274 is provided in the leftwardly projecting portion 248 of retract valve 238, and a pair of passages 276, 278 communicate between the outer surface of groove 274 and an annular passage 280 formed between the inner walls of retract valve 238 and extend valve 240 and the outer surface of retract actuator rod 252. By the action of spring 258 urging sealing surfaces 264, 268, into engagement with seats 266, 270, respectively, grooves 272, 274 are normally cut off from communication with body portion cavity 202.

In operation, the aforedescribed components function as follows. In a neutral position, wherein control stem 38 remains in its position as shown in FIGS. 12 and 13, resulting in no axial movement of actuator rod 190, sealing surfaces 264, 268 of valves 238, 240 are biased by spring 258 against seats 266, 270 for cutting off communication of fluid pressure from chamber 52 to chamber 76. Accordingly, there is no movement of piston rod 16 relative to cylinder 14.

Figure 14:
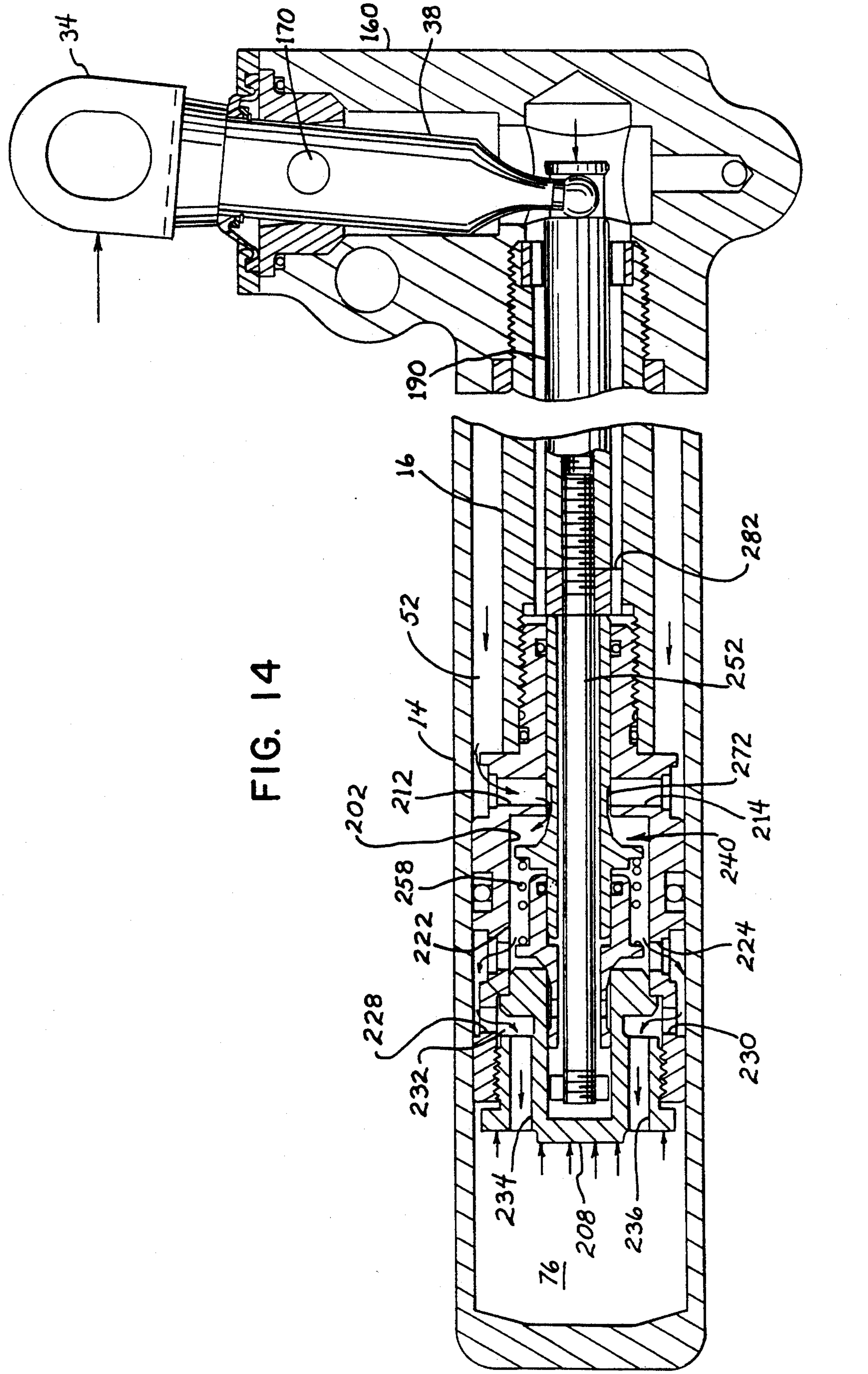
FIG. 14 is a view similar to FIG. 12, showing the valve and cylinder assembly in a position to allow extension of the piston rod.

To extend piston rod 16, yoke 34 is moved rightwardly by operation of steering cable 154 so as to cause clockwise pivoting of control stem 38 about pin 170, as shown in FIG. 14. This movement of control stem 38 causes leftward movement of actuator rod 190 within passage 188. When this occurs, an actuator member 282 mounted adjacent the end of actuator rod 190 moves into contact with the rightward end of the rightwardly projecting portion 246 provided on extend valve 240. As shown, this causes axial leftward movement of extend valve 240 against the force of spring 258, moving sealing surface 268 out of engagement with seat 270. Groove 272 formed on the exterior of extend valve projecting portion 246 then provides communication between the inwardly extending passages, such as 212, 214, and cavity 202. Pressurized fluid then flows from cavity 52 through passages 212, 214 and into cavity 202. From there, such fluid exits through passages 222, 224, and then through passages 228, 230 into cavity 232. From cavity 232, pressurized fluid flows through piston cap passages 234, 236 and into chamber 76, so as to exert fluid pressure on end surface 208 of piston cap 206. Flow of pressurized fluid in the described path continues all the while that control stem 38 is maintained in its extend position as shown in FIG. 14, causing extension of piston rod 16 relative to cylinder 14. This extension of piston rod 16 causes rightward movement of block 60, and thereby linkage 18 mounted thereto, so as to pivot drive unit 11 through arm 152.

When the desired amount of pivoting movement of drive unit 11 has been attained by extension of piston rod 16, the operator ceases turning the steering wheel, thereby resulting in movement of control stem 38 to its neutral position as shown in FIG. 12. This moves actuator member 282 out of engagement with the rightward end of extend valve projecting portion 246, and spring 258 then returns extend valve 240 to its normal position in which sealing surface 268 engages seat 270, thereby cutting off communication of chamber 52 with cavity 202. The position of piston rod 16 is thus maintained relative to cylinder 14, and thereby the desired angular position of drive unit 11 relative to the boat.

Figure 15:
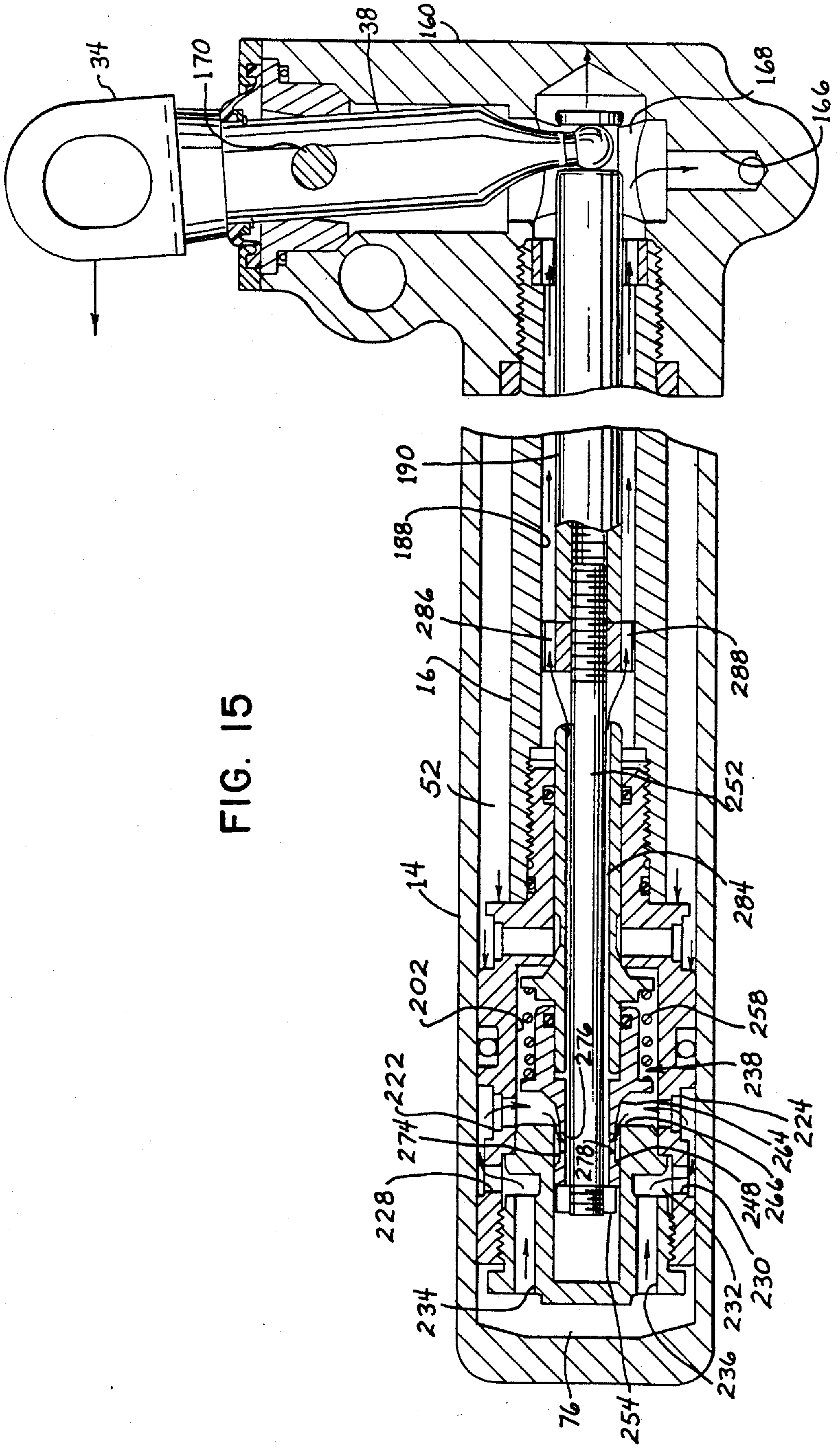
FIG. 15 is a view similar to FIGS. 12 and 14, showing the valve and cylinder assembly in a position to allow retraction of the piston rod.

When it is desired to turn drive unit 11 in the opposite direction, the operator turns the steering wheel so as to actuate steering cable 154 and move control stem 38 to its position as shown in FIG. 15, wherein control stem 38 is pivoted counterclockwise about pin 170. When in this position, control stem 38 causes rightward movement of actuator rod 190 within passage 188. Such movement of actuator rod 190 moves retract actuator rod 252 rightwardly, causing engagement of nut 254 provided at its leftward end with the leftward end of projecting portion 248 of retract valve 238 against the bias of spring 258. Such rightward movement of retract valve 238 moves sealing surface 264 out of engagement with seat 266, providing communication of groove 274 formed in leftwardly projecting portion 248 of retract valve 238 with cavity 202. As noted previously, fluid pressure is always present within chamber 52 acting on the surfaces of body portion 200 in contact therewith, tending to cause leftward movement of piston assembly 206 within cylinder 14. When retract valve 238 is moved to its FIG. 15 position as described above, fluid pressure within chamber 76 is relieved, and the pressure of fluid in chamber 52 causes fluid within chamber 76 to be exhausted therefrom. This results in leftward movement of piston assembly 196 within cylinder 14, and thereby retraction of piston rod 16 into cylinder 14.

Fluid within chamber 76 is exhausted through passages 234, 236 in piston cap 206, which then travels through cavity 232, passages 228, 230 and passages 222, 224 into cavity 202. Exhausted fluid then flows from cavity 202 through groove 274 and passages 276, 278 into the annular space, shown at 284, provided between the internal surfaces of valve members 238, 240 and the external surface of retract actuator rod 252. From space 284, exhausted fluid flows into passage 188 and through passages, such as 286, 288, formed in retract actuator member 282 and into the annular space around actuator rod 190. Such fluid flow continues rightwardly through piston rod 16 and into block 160, wherein exhausted fluid flows into cavity 168 and through passage 166 to hose 28, which returns exhausted fluid to casing 106. This retraction of piston rod 16 causes movement of linkage 18 therewith, resulting in rotation of drive unit 11. As described previously, when the desired position of drive unit 11 is attained, the operator stops turning the steering wheel and the signal provided to yoke 34 through steering cable 154 is cut off. Accordingly, spring 258 once again biases retract and extend valves 238, 240, respectively, to their closed position for preventing further fluid flow, thereby maintaining rod 16 in its desired position.

It has been found that the power steering system constructed according to the invention provides highly satisfactory operation. Because fluid pressure is supplied to the system through an accumulator, there is no need for the engine to be running in order to operate the power steering system. This is in contrast to previous power steering systems, in which fluid pressure was supplied to the system from a pump operating responsive to the engine. Pressure supplied by the accumulator to the power steering system is constant. There is always pressure to the system. The pump 46 is activated only when the volume of oil in the accumulator 20 is low or below a predetermined level.

Additionally, the unique internal hydraulic valving provides a low-resistance steering system, in that, essentially, the only force to be overcome to effect steering is that of spring 258, which normally urges valves 238, 240 to their closed position. That is, the valves which are actuated in order to operate the system are not acted on by oil pressure within the cylinder. This is possible because the area projected or presented to the pressurized fluid by both the leftwardly and rightwardly facing surfaces of valves 238 and 240 are substantially equal. In other words, the forces urging each valve open or closed are equal because the projected area of each end of each valve, that the forces can work on, are equal. Accordingly, it is not necessary to overcome hydraulic fluid pressure on any of the valving components in order to initiate steering, in contrast to previous systems. Whether cylinder oil pressure is high or low, the force required on the part of the operator to actuate the system remains the same. The only force urging the valves 238, 240 into engagement with the seats and to be overcome is that from spring 258.

Piston assembly body portion 200 is a one-piece member, and piston assembly 196 is easily constructed by simply mating extend valve 240 with retract valve 238, placing them within cavity 202 and threading piston cap 206 into the end of body portion 200. This assembly is then threaded onto the end of actuator rod 16, and the entire assembly placed within the cavity of cylinder 14.

It has been found that, with the system of the invention, oil pressure of up to 3000 psi can be provided within chamber 52. Because of the unique valve construction, there is no force resulting from oil pressure which must be overcome in order to effect steering. Accordingly, highly satisfactory operation can be achieved with oil pressure of this magnitude, and ease of opening the valve system to initiate steering is not effected in any way.

The power steering system of the invention provides a zero-feedback system. With most marine steering systems, in a single propeller application, drive unit 11 tends to pull the boat in a certain direction due to propeller torque. Accordingly, the driver must continue to apply force to the steering wheel all the while during turning in order to overcome propeller torque and keep the boat on course. If the driver were to let go of the steering wheel, the wheel tends to rotate in a certain direction, providing self-steering of the boat. In a normal system in which the propeller rotates clockwise, the boat tends to pull to the right. With the system of the invention, when the proper position of drive unit 11 is reached by appropriate extension or retraction of piston rod 16, the input signal through steering cable 154 is terminated, causing actuator rod 190 to return to its neutral position. When this occurs, spring 258 provides a self-locking action by forcing valves 38, 40 into their normally closed position, cutting off fluid flow and maintaining drive unit 11 in its position as desired. The tendency of propeller torque to steer the boat is thus overcome. There is no feedback to the steering cable as a result of engine torque, and the system of the invention essentially "locks" the position of drive unit 11.

The construction of control stem 38 and yoke 34, and the pivot system therefore, provides satisfactory operation under normal conditions. However, this construction is also sufficient to operate the steering system in the event fluid pressure is for some reason cut off. When this occurs steering can still be effected, but without the hydraulic assist provided by the power steering system of the invention. To effect steering, the operator moves the wheel in order to provide axial movement of steering cable 154 and output ram 158, which movement is then transferred through yoke 34, control stem 38 and block 160 to linkage 18, and thereby to steering arm 152. The construction of yoke 34 and control stem 38 is sufficient to accommodate loading in this situation, including that resulting from propeller torque.

In contrast to other hydraulic assist steering systems, the system of the present invention requires no oil flow during normal operation when no steering is required. Most other systems require a constant flow of oil in order to operate.

It is recognized that various alternatives and modifications are possible in the scope of the appended claims.

I claim:

1. A marine propulsion system, comprising:

a steerable marine drive unit pivotably mounted to a boat:

an operator controlled steering input mechanism;

a steering linkage interposed between the steering input mechanism and the marine drive unit; and a power steering system interconnected with the steering input mechanism and the steering linkage for effecting pivoting movement of the marine drive unit, comprising an extendible and retractable rod interconnected with the steering linkage; a piston having first and second sides and including an internal cavity, with the first side of the piston being connected to an end of the rod; a fixed cylinder within which the piston is slidably mounted; a source of pressurized fluid for providing pressurized fluid to the interior of the cylinder; a valve arrangement for communicating pressurized fluid to both the first and second sides of the piston, the valve arrangement being movable to selectively supply pressurized fluid to, and exhaust fluid from, the interior of the cylinder adjacent the second side of the piston to effect movement of the rod, wherein the valve arrangement comprises an extend valve movable between a closed position and an open position in which pressurized fluid is communicated from the first side to the second side of the piston, and a retract valve movable between a closed position and an open position in which fluid is exhausted from the cylinder adjacent the second side of the piston, and wherein the extend and retract valves are located within the internal cavity of the piston and are each biased toward their closed positions, and wherein the extend and retract valves are movable toward and away from each other between their open and closed positions, and wherein the extend and retract valves are biased toward their closed positions by means of a spring disposed therebetween; and an actuator mechanism connected to the steering input mechanism for selectively moving the valve arrangement.

2. The marine propulsion system of claim 1, wherein the extend and retract valves are each engaged with a seat when in their closed positions, and wherein each valve includes an angled surface for engaging the seat when the valve is in its closed position.

* * * * *